United States Patent
Luthi et al.

[15] 3,690,571
[45] Sept. 12, 1972

[54] APPARATUS FOR DISINTEGRATING AND SEPARATING MATERIAL IN FLUID SUSPENSION

[72] Inventors: Oscar Luthi; Rudi W. Schleinkofer, both of Nashua, N.H.

[73] Assignee: Improved Machinery Inc., Nashua, N.H.

[22] Filed: May 12, 1971

[21] Appl. No.: 142,459

[52] U.S. Cl. .................... 241/46 R, 209/3, 209/250, 241/79.3, 241/92, 241/245, 241/258
[51] Int. Cl. ........................ B02c 13/14, B03b 1/00
[58] Field of Search ....... 241/46, 46.02, 46.04, 46.11, 241/79.3, 46.06, 91, 92, 97, 185 A, 245, 257 R, 258; 209/3, 17, 250, 271, 279–280, 350–351; 415/52, 121

[56] References Cited

UNITED STATES PATENTS

| | | |
|---|---|---|
| 2,973,153 | 2/1961 | Rich ........................ 241/92 X |
| 3,310,242 | 3/1967 | Perkins et al. ................ 241/92 |

Primary Examiner—Robert L. Spruill
Attorney—Frank S. Troidl, David W. Tibbott and Robert R. Paquin

[57] ABSTRACT

Apparatus comprising a chamber containing a centrifugal pump arranged to pump material in fluid suspension to an accepts discharge, and a screen which limits the size of the material supplied by the pump to the accepts discharge and is rotatably driven to cause disintegration of coarse material in the suspension. Baffle means adjacent the screen feed face divide the chamber into communicating inner and outer portions, suspension being supplied to the screen through the chamber inner portion; and rotary vanes induce vortex flow of suspension in the chamber outer portion whereby heavy material is separated from the suspension by centrifugal separation.

21 Claims, 7 Drawing Figures

INVENTORS
OSCAR LUTHI
RUDI W. SCHLEINKOFER

ATTORNEY

INVENTORS
OSCAR LUTHI
RUDI W. SCHLEINKOFER
BY
Robert R. Paquin
ATTORNEY

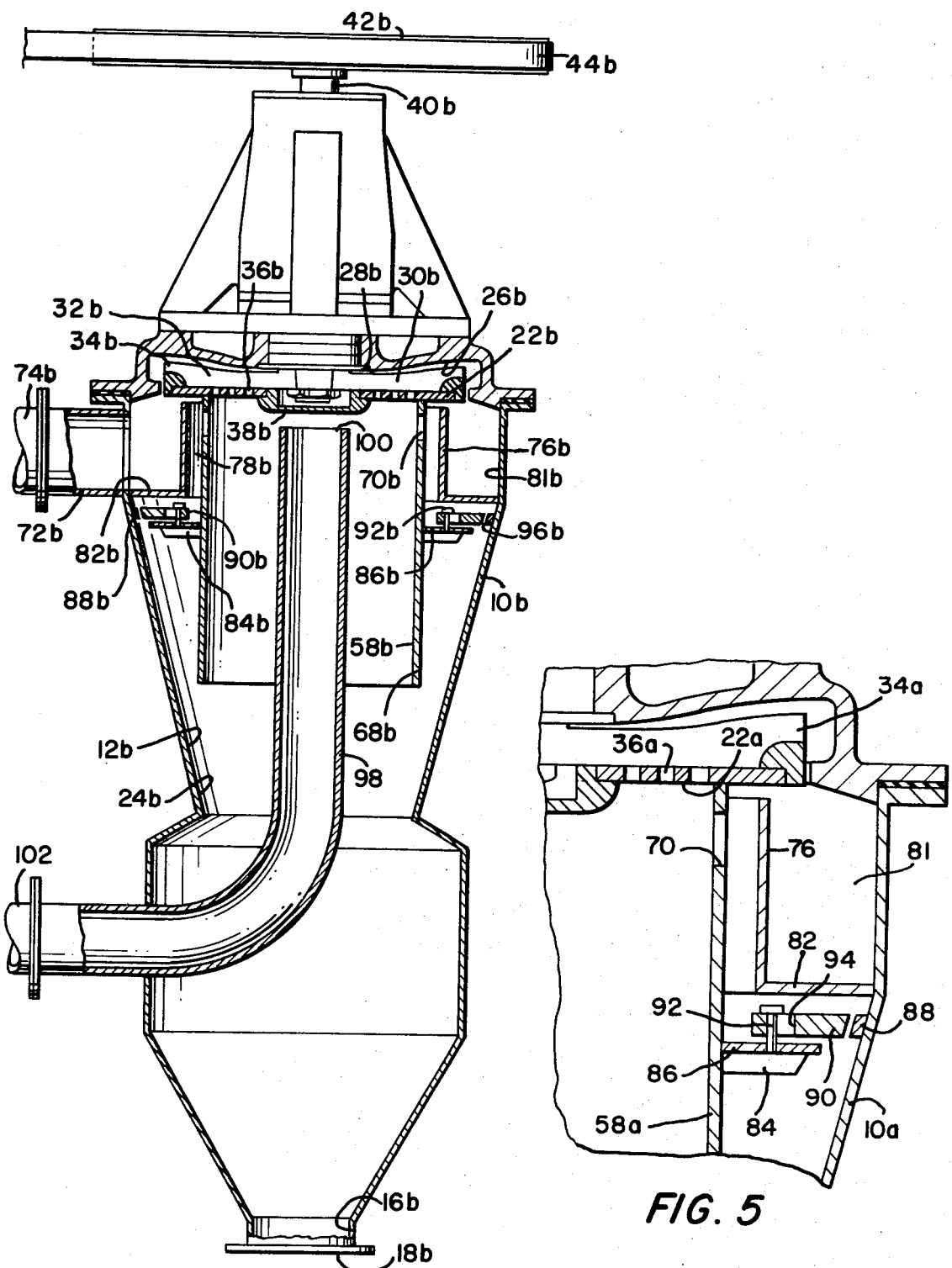

APPARATUS FOR DISINTEGRATING AND SEPARATING MATERIAL IN FLUID SUSPENSION

The present invention relates to apparatus for disintegrating and separating material in a fluid suspension such as, for example, a liquid suspension of fibrous material or an effluent sludge.

During the processing of liquid suspensions, frequently heavy material must be separated from a suspension and coarse lighter material either removed from the suspension or reduced to smaller acceptable size. For example, in the treatment of a fibrous suspension such as pulp, heavy material such as knots, wood chips, rocks and metal must be separated from the suspension; and coarse material such as fiber bundles or shives must be either removed or disintegrated or defibered to acceptable size. Similarly, during the processing of effluent sludge, heavy material in the sludge must be separated therefrom prior to dewatering to prevent damage to the dewatering equipment; and plastic and other coarse material must be either removed or reduced to smaller acceptable size.

Conventionally, various forms of apparatus have been provided in attempts to successfully accomplish these disintegration and separation operations, and example of one prior apparatus intended to perform both operations in a single operating step being disclosed in U.S. Pat. No. 3,310,242 issued Mar. 21, 1967 and assigned to the assignee of the present invention. Generally considered, however, the prior apparatus has been of undesirably low separating efficiency, particularly with respect to the separation of smaller particles of heavy material.

The principal object of the present invention is to provide a new and improved apparatus particularly constructed and arranged to provide efficient disintegration and separation of material in a fluid suspension, such as for example a liquid suspension of fibrous material or effluent sludge.

Another object of the invention is to provide a new and improved apparatus of the type set forth particularly constructed and arranged to be relatively simple and economical in construction and in operation.

Other objects and advantages of the invention will be apparent from the following description taken in connection with the accompanying drawings wherein the preferred forms of the invention have been shown by way of illustration only.

In accordance with the present invention, apparatus for disintegrating and separating material in fluid suspension may comprise housing means containing a chamber, accepts discharge means for discharging accepts from one end of the chamber, rejects discharge means for discharging rejects from the other end of the chamber, inlet means for introducing material in fluid suspension to the chamber intermediate the ends thereof, rotary pump means in the chamber between the inlet means and the accepts discharge means for pumping material in fluid suspension in the chamber to the accepts discharge means, screen means in the chamber intermediate the inlet means and the accepts discharge means for permitting material of predetermined size to be pumped by the pump means to the accepts discharge means while preventing larger material from passing to the latter, and baffle means in the chamber on the same side of the screen means as the inlet means, such baffle means dividing the chamber into an inner portion within the baffle means and an outer portion extending therearound, the chamber inner portion having an end communicating through the screen means with the accepts discharge means and also communicating with the chamber outer portion to permit material from the chamber inner portion rejected by the screen means to pass to the chamber outer portion, and the chamber inner portion at its other end communicating with the chamber outer portion to receive material in fluid suspension therefrom.

Referring to the drawings:

FIG. 5 is an enlarged, fragmentary, elevational sectional view of the apparatus shown in FIG. 4;

FIG. 7 is an elevational view, partially broken away and in section, illustrating an apparatus constructed in accordance with another embodiment of the invention.

Figure 1:
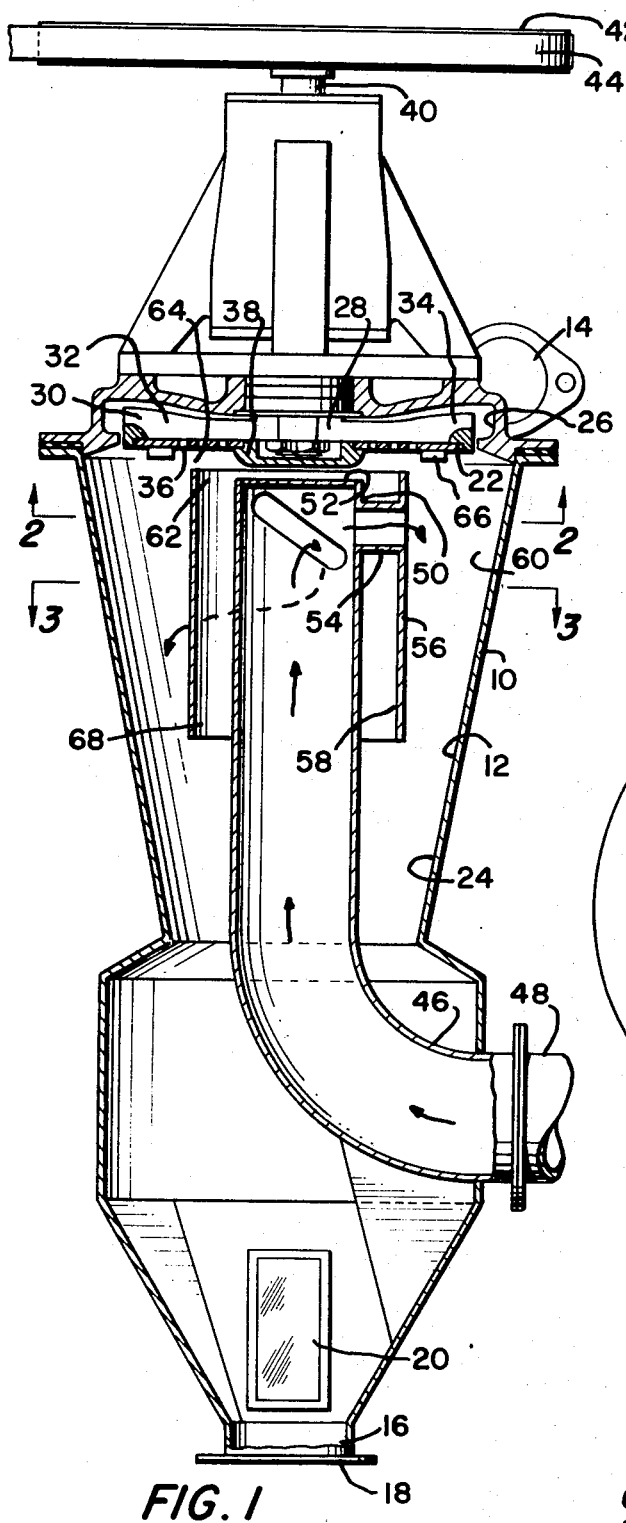
FIG. 1 is an elevational view, partially broken away and in section, of an apparatus constructed in accordance with one embodiment of the invention.
Figure 3:
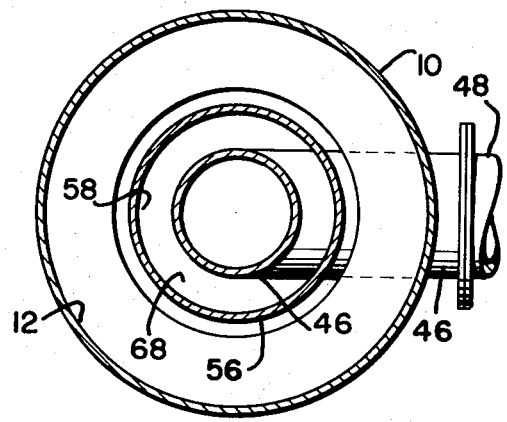
FIG. 3 is a sectional view taken on line 3—3 of FIG. 1, looking in the direction of the arrows.
Figure 2:
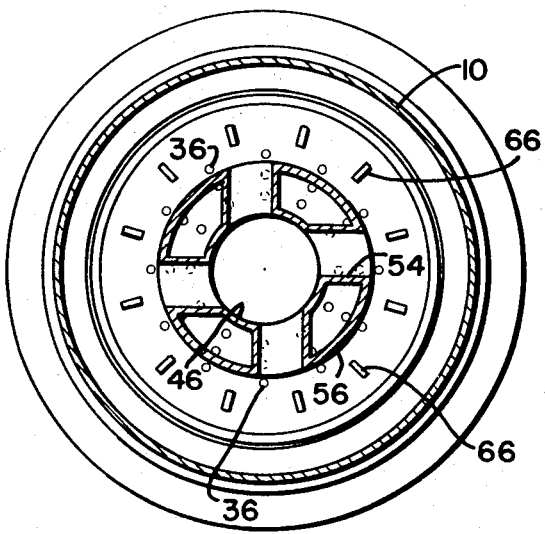
FIG. 2 is a sectional view taken on line 2—2 of FIG. 1, looking in the direction of the arrows.

Referring more particularly to the drawings wherein similar reference characters designate corresponding parts throughout the several views, the disintegrating and separating apparatus shown in FIGS. 1 through 3 comprises a housing 10 containing a vertically elongated, circular cross-section chamber 12 which preferably, as illustrated, includes a pair of inverted frusto-conical or downwardly tapering axial sections interconnected by a therebetween expanded axial section. The upper end of the chamber 12 is provided with a tangential accepts discharge outlet 14 which during the operation of the apparatus is connected through suitable conventional piping (not shown) to supply material in fluid suspension to a succeeding process in its treatment. The lower end of the chamber 12 is provided with a reject discharge outlet 16 which, as illustrated, may be normally closed by a closure plate 18 selectively opened during the operation of the apparatus to discharge rejects from the chamber 12. In this event, a viewing window 20 may be included to permit observation of the quantity of rejects collected in the lower end of the chamber 12. Alternatively, the rejects outlet 16 could, if desired, be open throughout the operation of the apparatus to a rejects discharge conduit (not shown) which continuously discharges rejects from the lower end of the chamber 12.

Intermediate the outlets 14, 16, a rotatable screen 22 is disposed across the chamber 12 to divide the latter into a therebelow separation compartment 24 which communicates with the rejects outlet 16 and a thereabove pumping compartment 26 which communicates with the accepts outlet 14. A centrifugal pump 28 is rotatably mounted in the pumping compartment 26 for continuously pumping material in fluid suspension accepted by the screen openings 36 to the accepts outlet 14. The centrifugal pump 28, as illustrated, comprises a plurality of vanes 30 therebetween defining radial passageways 32 which at their outer ends 34 (the pump outlet) communicate with the accepts outlet 14 and along their lower sides (the pump inlet) communicate with the separation compartment 24 through the screen openings 36. Preferably, the screen 22 is of annular configuration and mounted on the lower sides of the vanes 30 for conjoined rotation with the pump 28, the central opening in the screen 22 being closed by a hub 38. The pump 28 and screen 22 are, during the operation of the apparatus, continuously rotatably driven by a driving means comprising a shaft 40 carrying the pump 28, a sheave 42 mounted on the shaft 40 and an endless driving belt 44 connecting the sheave 42 with a drive motor (not shown).

Material in liquid suspension to be processed by the apparatus is supplied to the separation compartment 24 through an inlet means shown as comprising an inlet conduit 46 projecting into the enlarged portion of the chamber 12 and having an end connected to piping 48 which communicates with a pressurized source (not shown) of the material in liquid suspension. The inlet conduit 46 extends generally axially in the chamber 12 towards the screen 22 and has its other end 50 aligned with and closely adjacent the hub 38. The end 50 of the inlet conduit 46 is closed by a closure plate 52; and the material in liquid suspension is radially supplied from the conduit end 50 to the separation compartment 24 adjacent the screen 22 through a plurality of radial conduits 54 communicating with the inlet conduit 46 at locations arcuately spaced therearound.

An imperforate, annular, open ended baffle 56 is mounted around the inlet conduit 46 by the radial conduits 54 and divides the separation compartment 24 into an inner portion 58 within the baffle 56 and an outer portion 60 between the baffle 56 and the wall of the housing 10. The outer portion 60, as will be noted, communicates with the radial conduits 54 to radially receive the suspension supplied therethrough. The upper end of the baffle 56 is closely spaced from the screen 22 by a space 64; and the open upper end 62 of the inner portion 58 thus communicates both with the pumping compartment 26 through the screen openings 36 and also with the outer portion 60 through the space 62. As illustrated, the perforated area of the screen 22 is preferably generally the cross-sectional area of the annular flow passage defined in the inner portion 58 between the baffle 56 and the inlet conduit 46. The screen 22 carries a plurality of arcuately spaced vanes 66 radially outwardly of the baffle 56 for inducing vortex flow of material in liquid suspension in the outer portion 60 around the baffle 56 and causing recirculation of material in liquid suspension from adjacent the screen 22 downwardly around the baffle 56. In addition, as will be seen, the vanes 66 assist the screen 22 in disintegrating lighter coarse material in the suspension. The lower open end 68 of the inner portion 58 communicates with the outer portion 60 to receive material in liquid suspension therefrom.

In the operation of the apparatus, the pump 28 and the screen 22 are continuously rotatably driven; and material in liquid suspension is continuously radially supplied to the outer portion 60 of the separation compartment 24 through the conduits 46, 48, 54. The supplied suspension may be, for example, at a consistency of about 0.5 per cent to about 5 percent and may be fed through the conduits 46, 48, 54 at a relatively low feed pressure preferably above 2 psi. The thus supplied suspension is caused to flow downwardly in vortex flow in the outer portion 60 by the vortex created by the rotating screen 22 and its carried vanes 66. During this downward flow of the suspension, heavy particles of material of high specific gravity are moved outwardly adjacent the wall of the housing 10 by centrifugal force. These heavier particles of material continue downwardly below the lower end of the baffle 56 to the lower end of the chamber 12 where they are collected adjacent the rejects discharge opening 16. The collected material is periodically discharged from the chamber 12 by opening of the closure plate 18.

The liquid portion of the suspension and its contained lighter material of lower specific gravity flows into the open lower end 68 of the inner portion 58 and hence passes upwardly through the inner portion 58 around the inlet conduit 46 and out of the open upper end 62. The liquid in the upwardly moving suspension and the material of sufficiently small size to be accepted by the screen openings 36 passes through such openings 36 into the pumping compartment 26 where it is pumped by the pump 28 to the accepts outlet 14. The larger material in such upward flow is, however, prevented by the screen 22 from flowing to the pumping compartment 26 and in the zone of high turbulence and shear forces adjacent the screen 22 becomes disintegrated or defibered to smaller acceptable size and/or is downwardly directed in the outer portion 60 by the rotating vanes 66. The larger material passing downwardly through the outer portion 60 continues to be recycled through the inner portion 58 until either disintegrated to acceptable size after a number of passages or downwardly rejected with the heavier material to the rejects discharge outlet 16. The aforedescribed flow of material occuring during the operation of the apparatus is schematically depicted by the arrows in FIG. 1.

Figure 4:
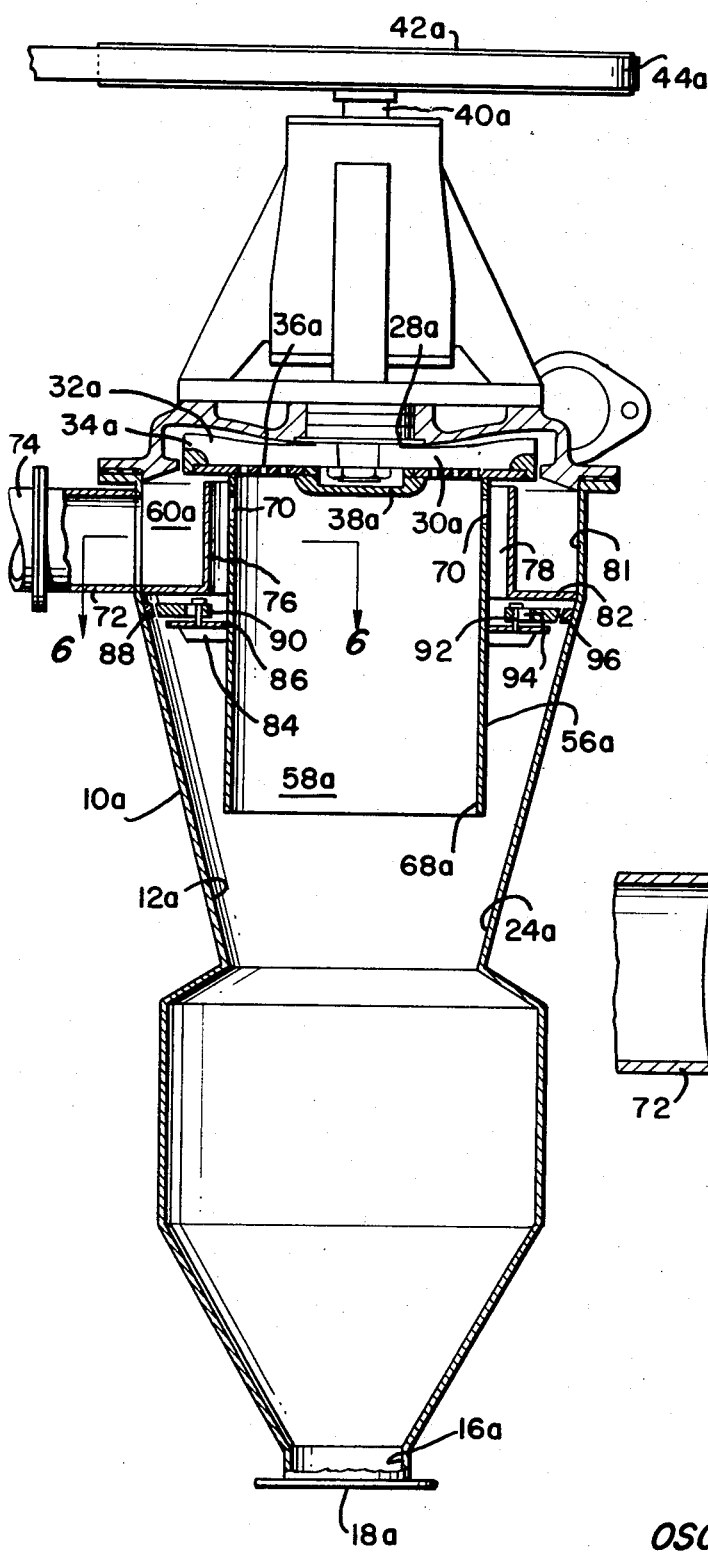
FIG. 4 is an elevational view, partially broken away and in section, of an apparatus constructed in accordance with a second embodiment of the invention.
Figure 6:
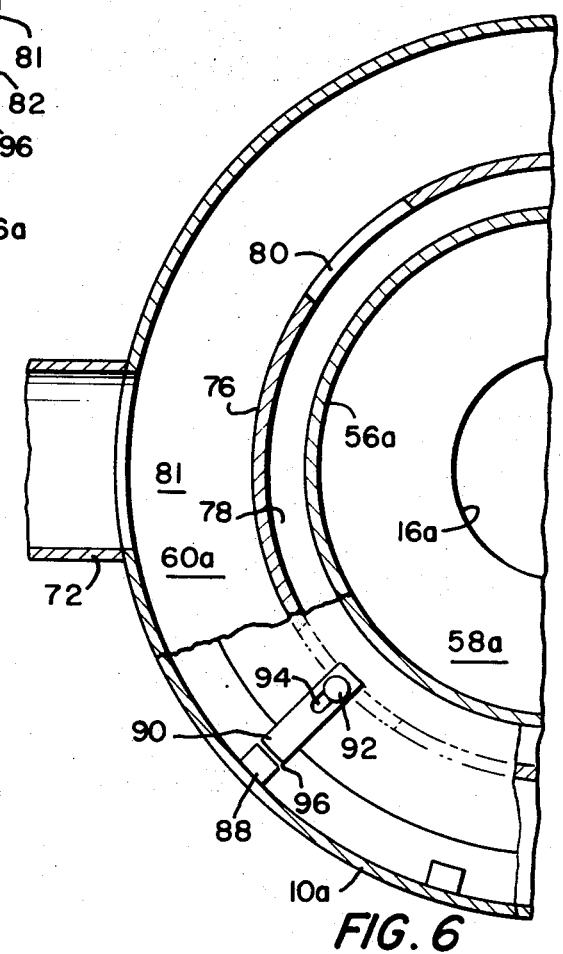
FIG. 6 is an enlarged sectional view taken along line 6—6 of FIG. 4, looking in the direction of the arrows.

FIGS. 4 through 6, wherein parts similar to those of the apparatus shown in FIGS. 1 through 3 are designated by the reference numeral for the previously described similar part followed by the suffix a, illustrates a modified embodiment of the apparatus in which the baffle 56a is mounted on the screen 22a for conjoined rotation therewith. Also, in the embodiment of FIGS. 4 through 6, the upper end of the inner portion 58a of the separation compartment 24a communicates with the outer portion 60a through openings 70 arcuately spaced around the baffle 56a; and the material in liquid suspension to be processed is radially supplied to the outer portion 60a through an inlet conduit 72 adjacent the screen 22a. The inlet conduit 72, as illustrated in FIG. 4, is connected to a supply pipe 74 which communicates with the source (not shown) of the material in liquid suspension to be processed. An annular baffle 76 is mounted in the outer portion 60a spaced around the baffle 56a by an annular passage 78 and forms the inner side of an annular feed chamber 81 which communicates with the inlet conduit 72 and is closed along its bottom by an annular floor 82. The annular baffle 76, as shown in FIG. 6, includes arcuately spaced openings 80 communicating the feed chamber 81 with the annular passage 78.

Below the feed chamber 81, the baffle 56a carries an annular mounting plate 86 having a plurality of arcuately spaced vanes 84 on its lower face, the vanes 84 being during the operation of the apparatus similar in function to the vanes 66 in the FIGS. 1 through 3 embodiment. In addition, the wall of the housing 10a and the mounting plate 86 carry spaced elements cooperative for disintegrating material passing therebetween. As illustrated, these cooperative elements are in the form of bed knives 88 mounted on the housing 10a at locations arcuately spaced around the baffle 56a and hammer elements 90 mounted on the upper face of the mounting plate 86 by bolts 92 received in substantially larger openings 94 in the hammer elements 90 to permit radial movement of the hammer elements 90 relative to the baffle 56a. The hammer elements 90 also serve as pumping vanes and hence the embodiment of the apparatus shown in Figs. 4 through 6 may be constructed to operate at a negative suction head by suitable design of the hammer elements 90.

In the operation of this embodiment of the invention, the pump 28a, screen 22a, and baffle 56a all are continuously rotatably driven. Material in liquid suspension is continuously supplied to the feed chamber 81 through the inlet conduit 72 and passes through the openings 80 to the annular space 78 and thence downwardly in the outer portion 60a of the separation compartment 24a. Due to centrifugal force, the hammer elements 90 are, of course, thrown outwardly from the baffle 56a towards the bed knives 88; and hence the spaces 96 between the hammer elements 90 and the bed knives are normally of their minimal dimensions whereby the bed knives 88 and hammer elements 90 provide disintegration of coarse material passing therebetween. However, in the event that large metallic or other similar non-disintegratable material enters the spaces 96, the hammer elements 90 are automatically moved inwardly to enlarge the spaces 96 and permit such material to pass therethrough without damage to either the hammer elements 90 or the bed knives 88. The material in liquid suspension, having passed below the hammer elements 90, enters the vortex induced by the vanes 84 whereupon heavy material of high specific gravity passes outwardly adjacent the wall of the housing 10a and thence moves downwardly to the rejects discharge 16a. The liquid component of the suspension and the lighter material therein flow upwardly into the lower open end 68a of the inner portion 58a within the baffle 56a; and such liquid component and the smaller acceptable material is accepted by the screen openings 36a and pumped by the pump 28a to the accepts outlet 14a. The coarser material in the inner portion 58a of too large size to be accepted by the screen openings 36a is subjected to high turbulence and shear forces adjacent to the screen 22a and resultantly is either disintegrated smaller acceptable size or recirculated through the openings 70 to the annular passage 78 from whence it continues to be recirculated until disintegrated to smaller acceptable size or rejected to the rejects discharge outlet 16a with the heavier material.

FIG. 7, wherein parts similar to those aforedescribed are designated by the reference numeral for the similar aforedescribed part followed by the suffix b, illustrates a third embodiment of the invention. The FIG. 7 embodiment differs from the FIGS. 4 through 6 embodiment only in that the former includes a second rejects discharge outlet in the form of a rejects conduit 98 having a rejects receiving end 100 coaxially in the inner portion 58a of the separation compartment 24a. The rejects conduit 98 extends downwardly in the separation compartment 24b coaxially thereof and, similarly to the inlet conduit 46 shown in FIG. 1, projects from the separation compartment 24b at the expanded portion of the chamber 12b. The rejects conduit 100 is shown in FIG. 7 as connected to conventional piping shown fragmentarily as 102, in turn, connected to a suitable discharge tank at sub-atmospheric pressure or vacuum. The operation of the FIG. 7 apparatus is identical to that of the aforedescribed FIGS. 4 through 6 apparatus except that coarse material of relatively light specific gravity in the inner portion 58b is discharged from the separation compartment 24b through the discharge conduit 98.

From the aforegoing it will be seen that the invention provides new and improved means for accomplishing all of the aforestated objects and advantages. It will be understood, however, that, although only three embodiments of the invention have been illustrated and hereinbefore specifically described, the invention is not limited merely to these three embodiments but rather contemplates other embodiments and variations within the scope of the following claims.

Having thus described our invention, we claim:

1. Apparatus for disintegrating and separating material in fluid suspension, comprising housing means containing a chamber, accepts discharge means for discharging accepts from one end of said chamber, rejects discharge means for discharging rejects from the other end of said chamber, inlet means for introducing material in fluid suspension to said chamber intermediate the ends thereof, rotary pump means in said chamber between said inlet means and said accepts discharge means for pumping material in fluid suspension in said chamber to said accepts discharge means, screen means in said chamber intermediate said inlet means and said accepts discharge means for permitting material of predetermined size to be pumped by said pump means to said accepts discharge means while preventing larger material from passing to said accepts discharge means, and baffle means in said chamber on the same side of said screen means as said inlet means, said baffle means dividing said chamber into an inner portion within said baffle means and an outer portion extending therearound, said chamber inner portion having an end communicating through said screen means with said accepts discharge means and also communicating with said chamber outer portion to permit material from said chamber inner portion rejected by said screen means to pass to said chamber outer portion, and said chamber inner portion at its other end communicating with said chamber outer portion to receive material in fluid suspension therefrom.

2. Apparatus according to claim 1, wherein said screen means is intermediate the inlet of said pump means and said inlet means, and said first mentioned end of said chamber inner portion is adjacent to said screen means.

3. Apparatus according to claim 2, further comprising vane means in said chamber for inducing vortex flow of material in fluid suspension around said baffle means.

4. Apparatus according to claim 3, wherein said screen means is rotatable and said vane means is mounted for rotation with said screen means.

5. Apparatus according to claim 4, wherein said baffle means is carried by said screen means and said vane means is mounted on said baffle means.

6. Apparatus according to claim 3, wherein the end of said baffle means adjacent to said screen means is spaced from the latter, and said first mentioned end of said chamber inner portion communicates with said chamber outer portion through the space between such end of said baffle means and said screen means.

7. Apparatus according to claim 3, further comprising second rejects discharge means having a receiving end within said chamber inner portion for receiving material therein.

8. Apparatus according to claim 7, wherein said second rejects discharge means comprises a discharge conduit which extends axially of said chamber and projects through a wall of said housing means at a location axially spaced along the chamber from said baffle means.

9. Apparatus according in claim 3, wherein said inlet means comprises an inlet conduit projecting into said chamber adjacent its said other end and extending generally axially of said chamber to have an end in said chamber inner portion, and inlet conduit means communicating said conduit end with said chamber outer portion.

10. Apparatus according to claim 9, wherein said baffle means is carried by said conduit.

11. Apparatus according to claim 3, further comprising spaced means on said baffle means and said housing means cooperative for disintegrating material supplied to said chamber through said inlet means.

12. Apparatus according to claim 11, wherein said cooperative means are relatively movable to vary the size of the therebetween space.

13. Apparatus according to claim 3, wherein said inlet means includes an inlet conduit connected to said chamber adjacent to said screen means, and further comprising second baffle means extending around said baffle means opposite said inlet conduit, said second baffle means having openings therethrough permitting flow from said inlet conduit intermediate said baffle means and said second baffle means.

14. Apparatus according to claim 13, further comprising said screen means being rotatable, said baffle means being carried by said screen means for rotation therewith, and spaced means on said baffle means and said housing means cooperative for disintegrating material supplied to said chamber through said inlet means.

15. Apparatus according to claim 3, wherein said inlet means is connected to radially discharge material to said chamber outer portion, said one end of said chamber is its upper end and said other end is its lower end.

16. Apparatus for disintegrating and separating material in fluid suspension, comprising housing means containing a chamber, rotatable screen means in said chamber dividing said chamber into a pumping compartment on one side of said screen means and a separation compartment on the other side of said screen means, accepts discharge means connected to said pumping compartment for discharging accepts therefrom, rejects discharge means connected to said separation compartment for discharging rejects therefrom, inlet means for introducing material in fluid suspension to said separation compartment intermediate said rejects discharge means and said screen means, centrifugal pump means in said pumping compartment for pumping material in fluid suspension in said pumping compartment to said accepts discharge means, drive means for rotatably driving said centrifugal pump means and said screen means, baffle means in said separation compartment dividing said separation compartment into an inner portion contained within said baffle means and an outer portion extending therearound, and vane means in said chamber for inducing vortex flow of material in fluid suspension around said baffle means, said inner portion of said separation compartment having an open end adjacent said screen means communicating through said screen means with the inlet of said pump means, and also communicating with said outer portion of said separation compartment to permit material from said inner portion rejected by said screen means to pass to said outer portion, and said inner portion at its other end being open to communication with said outer portion to receive material in fluid suspension therefrom.

17. Apparatus according to claim 16, wherein said inlet means comprises an inlet conduit extending axially in said separation compartment and having an end in said inner portion thereof, and said inlet means also comprises conduit means communicating said end of said inlet conduit with said outer portion of said separation compartment for supplying material in fluid suspension from said inlet conduit to said outer portion.

18. Apparatus according to claim 17, wherein said baffle means is mounted on said inlet conduit, and the end of said baffle means most adjacent to said screen means is spaced from said screen means by a space communicating said inner and outer portions of said separation compartment.

19. Apparatus according to claim 16, wherein said inlet means comprises an inlet conduit communicating with said outer portion of said separation compartment adjacent to said screen means, and said baffle means is mounted on said screen means for rotation therewith, said baffle means including openings therethrough communicating said inner and outer portions of said separation compartment.

20. Apparatus according to claim 19, wherein said baffle means and said housing means carry spaced elements cooperative for disintegrating material supplied to said chamber through said inlet means, said spaced elements being relatively movable to vary the cross-section of the therebetween space.

21. Apparatus according to claim 20, further comprising second rejects discharge means having a receiving end in said inner portion of said separation compartment for receiving material therefrom.

* * * * *